(12) United States Patent
Cassata et al.

(10) Patent No.: US 9,237,039 B2
(45) Date of Patent: Jan. 12, 2016

(54) TRANSCEIVER SUITABLE FOR IO-LINK DEVICES AND RELATED IO-LINK DEVICE

(71) Applicant: STMICROELECTRONICS S.r.l., Agrate Brianza (IT)

(72) Inventors: Salvatore Cassata, Palermo (IT); Francesco Pulvirenti, Acireale (IT); Salvatore Giuseppe Privitera, Catania (IT)

(73) Assignee: STMICROELECTRONICS S.R.L., Agrate Brianza (MB) (IT)

(*) Notice: Subject to any disclaimer, the term of this patent is extended or adjusted under 35 U.S.C. 154(b) by 2 days.

(21) Appl. No.: 14/307,098

(22) Filed: Jun. 17, 2014

(65) Prior Publication Data

US 2015/0003503 A1   Jan. 1, 2015

(30) Foreign Application Priority Data

Jun. 27, 2013   (IT) .............................. MI2013A1077

(51) Int. Cl.
| | |
|---|---|
| H03K 3/00 | (2006.01) |
| H04L 25/02 | (2006.01) |
| H04B 3/00 | (2006.01) |
| H02H 9/04 | (2006.01) |

(52) U.S. Cl.
CPC .............. *H04L 25/0292* (2013.01); *H02H 9/04* (2013.01); *H04B 3/00* (2013.01); *H04L 25/028* (2013.01); *Y10T 29/49169* (2015.01)

(58) Field of Classification Search
CPC .................................................. H04L 25/0292
See application file for complete search history.

(56) References Cited

U.S. PATENT DOCUMENTS

| | | | |
|---|---|---|---|
| 2003/0094970 A1* | 5/2003 | Freitas ............................. | 326/34 |
| 2013/0193754 A1* | 8/2013 | Sugiyama et al. ........... | 307/10.7 |

OTHER PUBLICATIONS

STMicroelectronics, "IO-Link communication master transceiver", L6360, Jan. 2013, pp. 1-66.
Maxim Integrated Product, "IO-Link device transceiver", MAX14820, Jul. 2012, pp. 1-29.

* cited by examiner

*Primary Examiner* — Daniel Puentes
(74) *Attorney, Agent, or Firm* — Allen, Dyer, Doppelt, Milbrath & Gilchrist, P.A.

(57) ABSTRACT

A transceiver is connectable to a cable with at least three wires. The transceiver may include a controlled output stage including a high-side leg, having two P-type transistors coupled in series and having a common current terminal, coupled between an output pin and a positive supply pin. The P-type transistors have body regions coupled to the common current terminal of the high-side leg. A low-side leg, includes two N-type transistors coupled in series and having a common current terminal, coupled between the output pin and a negative supply pin. The N-type transistors have body regions coupled to the common current terminal of the low-side leg. The protection circuit also includes a voltage clamper coupled between the common current terminals.

19 Claims, 8 Drawing Sheets

# TRANSCEIVER SUITABLE FOR IO-LINK DEVICES AND RELATED IO-LINK DEVICE

FIELD OF THE INVENTION

This disclosure relates to communication interfaces between sensors and actuators in industrial environments, and more particularly, to a transceiver that may be suitable for IO-Link™ devices powered and communicating through a tree-wire cable, protected against wrong connection with inverted polarity to a three-wire communication cable.

BACKGROUND OF THE INVENTION

Figure 1:
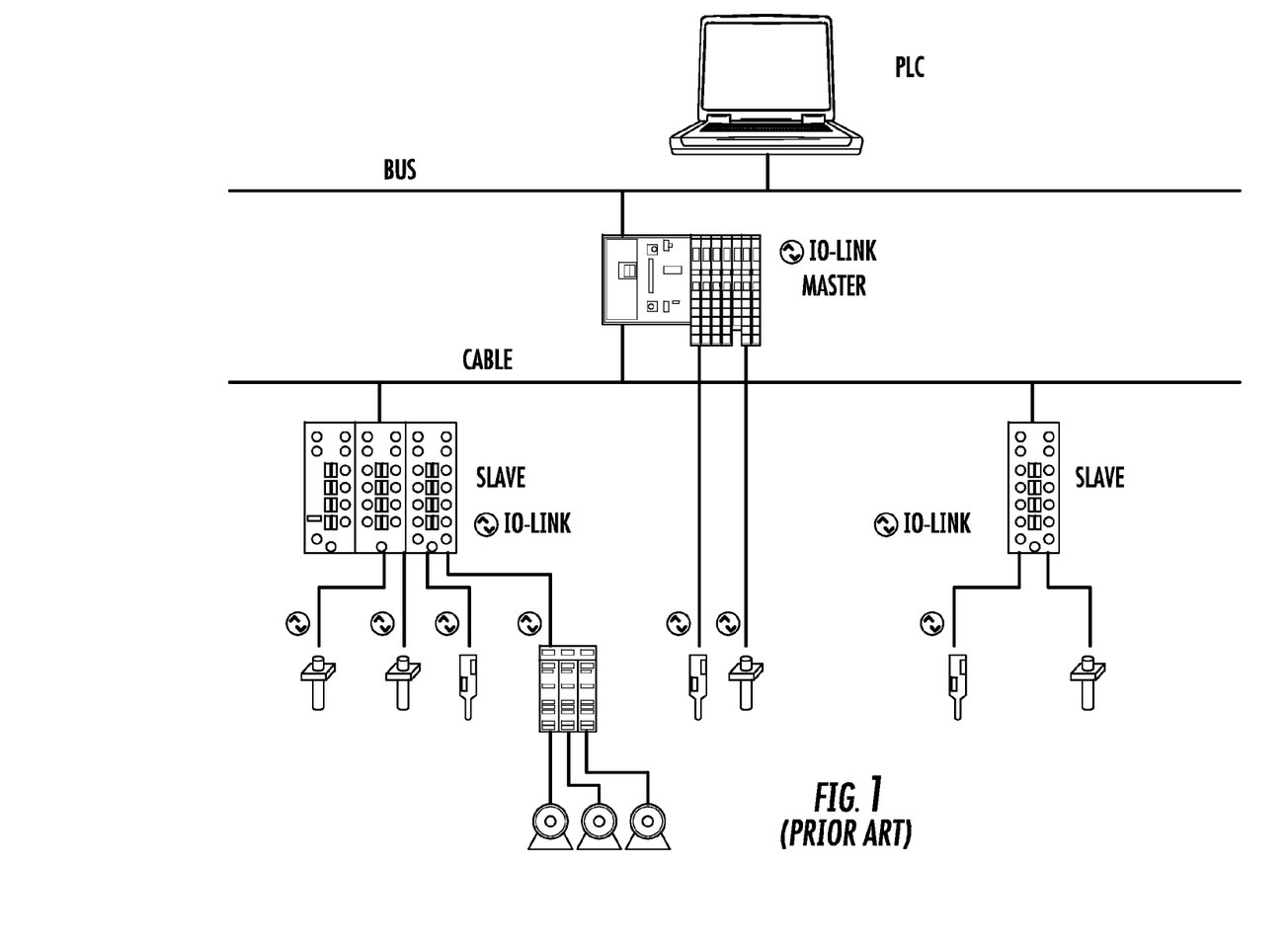
FIG. 1 depicts an IO-Link™ system as in the prior art.

IO-Link™ is a standardized IO technology for point-to-point communication with sensors and with actuators using a system realized as shown in FIG. 1. Sensors and/or actuators of the system are each connected to a respective port of a slave device, that collects data and transmits them to a master device through a cable. On its turn, the master device is connected to a PLC (Programmable Logic Controller) that controls the whole system through a bus.

Figure 2:
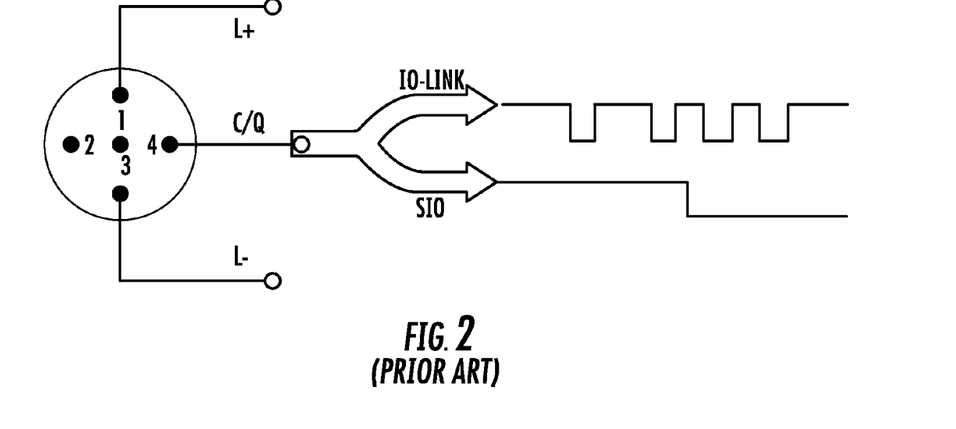
FIG. 2 shows a port of an IO-Link™ device to which a three-wire or a four-wire cable may be connected as in the prior art.
Figure 3:
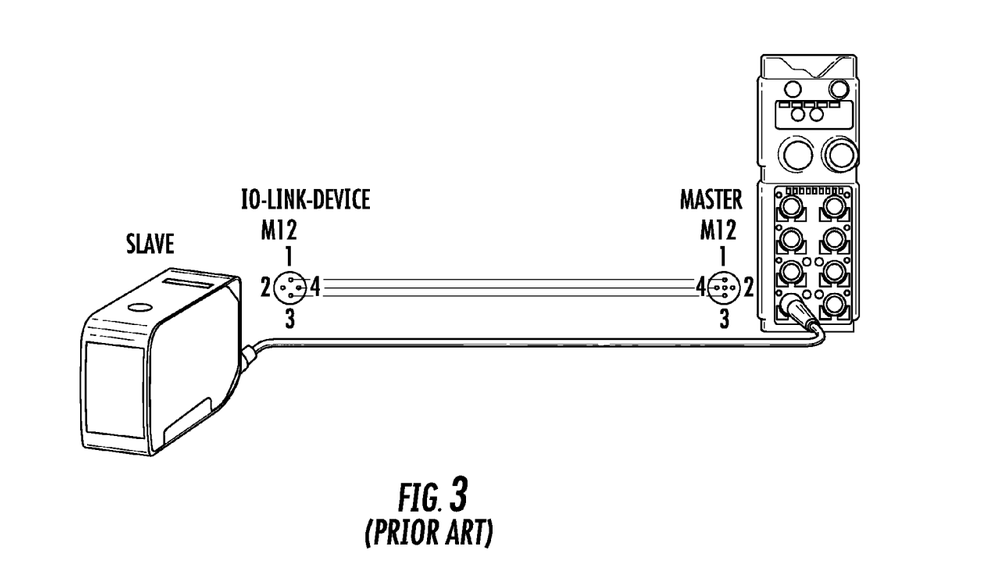
FIG. 3 shows an IO-Link~ master device connected to an IO-Link™ slave device through a cable as in the prior art.

The ports of the IO-Link™ devices may be of the type shown in FIG. 2. A master device is connected to a slave device as shown in FIG. 3, through a three-wire cable that includes a positive supply line L+, a negative supply line L− and a digital data line C/Q. The master device thus provides power supply to the slave device and communicates thereto through the digital data line, on which a switching data signal is transmitted.

Figure 4:
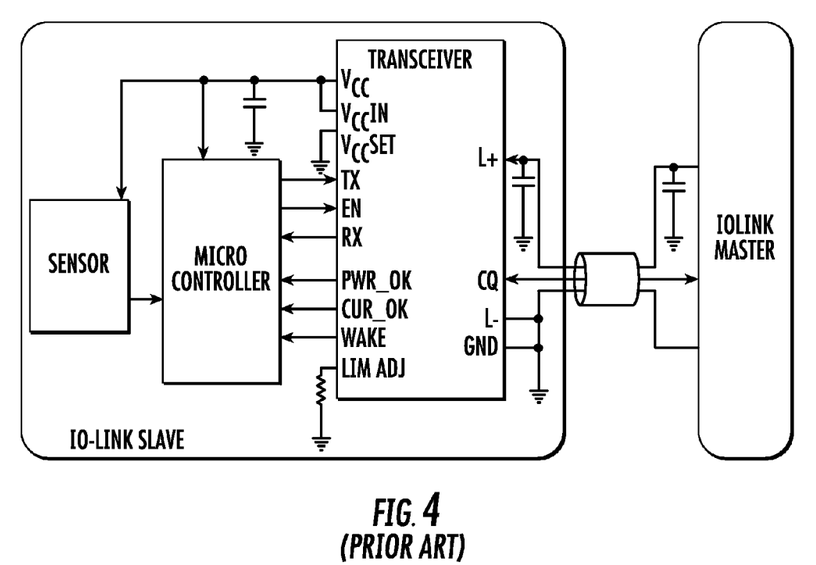
FIG. 4 shows an exemplary block diagram of an IO-Link™ slave device including a transceiver, a microcontroller and a sensor, connected through a three-wire cable to a corresponding master device as in the prior art.

FIG. 4 shows a typical scheme of a slave IO-Link™ device, that may optionally include a microcontroller, eventually coupled to a sensor or actuator, and an IO-Link™ transceiver that interfaces the microcontroller with the three-wire cable. The transceiver sends to/receives from the microcontroller signals of information (RX, TX) of data to be sent through the data line C/Q of the cable, and provides to the microcontroller an internal supply voltage Vcc.

If the cable is connected to the pins of the transceiver with inverted polarity, the voltages on the power supply pins L+, L− and on the input/output pin C/Q may be such as to damage the microcontroller or even the inner circuits of the transceiver itself. For safety reasons of the internal components of the device, present transceivers for IO-Link™ applications include a protection circuit, typically comprising passive components such as Zener diodes or Schottky diodes. The Zener diodes ensure protection from overvoltage on the line, and the Schottky diodes prevent destructive current flow in case of a reverse polarity connection, i.e. when the power supply pins L+, L− are connected with inverted polarity to the respective supply lines of the cable. With this technique, potentially destructive voltages are prevented from being distributed internally to the IO-Link™ device.

Figure 5:
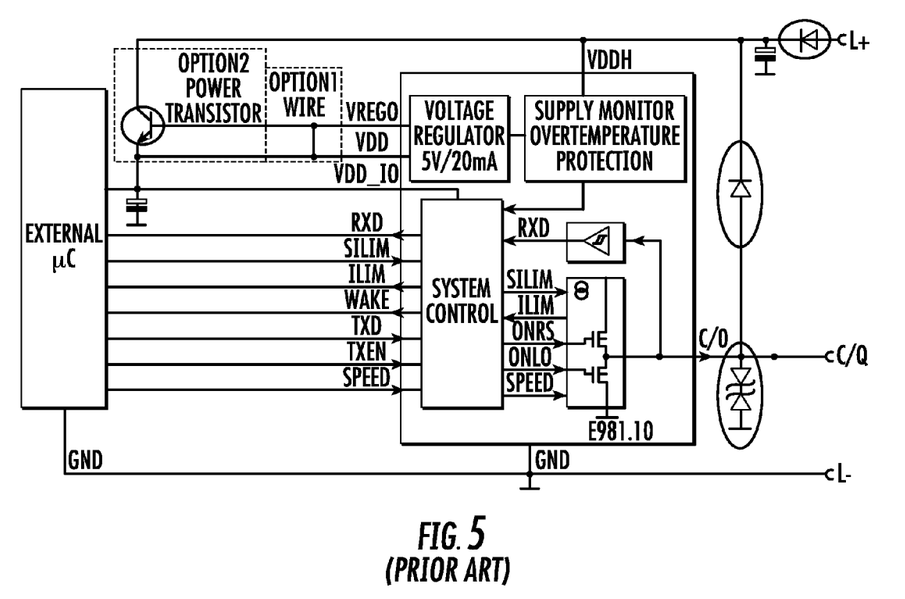
FIG. 5 shows the prior art transceiver E981.10 for IO-Link™ devices, manufactured by Elmos, connected to an external microcontroller, in which the external passive components of the protection circuit are highlighted.

FIG. 5 depicts a transceiver E981.10 manufactured by Elmos coupled to a microcontroller. The protection circuit is provided by the external TVS (Transient-Voltage-Suppression) diodes between the data line C/Q and ground, by the diode between the data line C/Q and the positive supply line L+ and by the diode in series to the positive supply line L+. Such a protection circuit is relatively expensive because it uses external passive components; moreover, the diode connected in series to the positive supply line increases power losses.

Figure 6A:
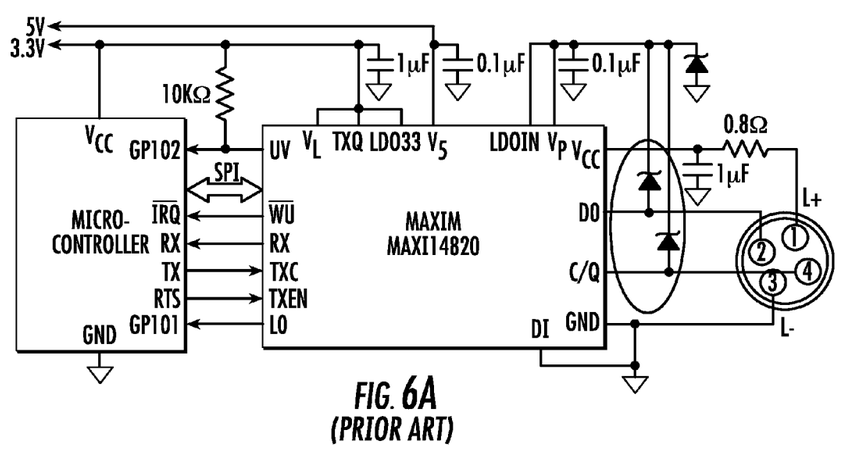
FIG. 6A illustrates the prior art transceiver MAX14820 for IO-Link™ devices, manufactured by Maxim, connected to an external microcontroller, in which the external passive components of the protection circuit are highlighted.
Figure 6B:
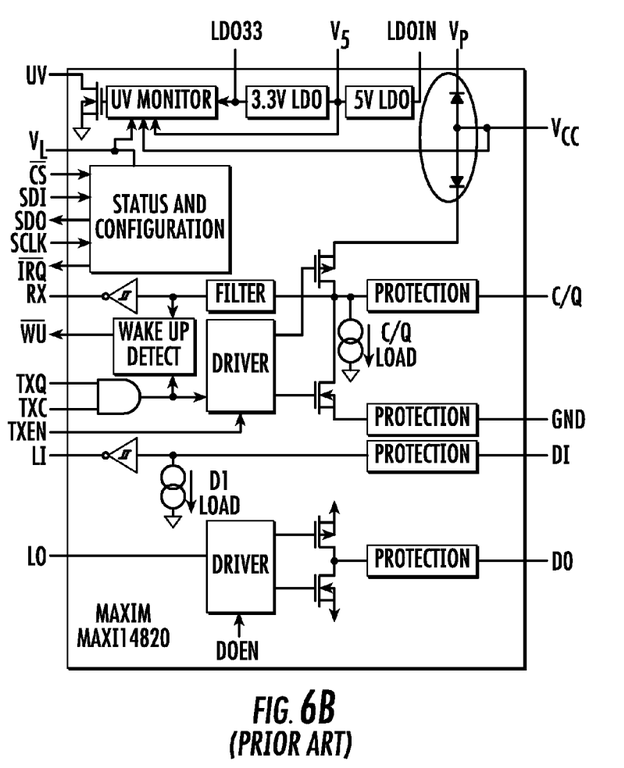
FIG. 6B is a block diagram of the transceiver MAX14820, in which the internal passive components of the protection circuit are highlighted as in the prior art.

FIG. 6a illustrates how to connect the transceiver MAX14820 manufactured by Maxim, and FIG. 6b shows the internal architecture thereof. This known transceiver has a protection circuit including external diodes (FIG. 6a) connected between the data terminals C/Q, DO and the auxiliary supply voltage input $V_P$, and of the two internal diodes highlighted in FIG. 6b. Also for this transceiver, external passive components are required.

Figure 7:
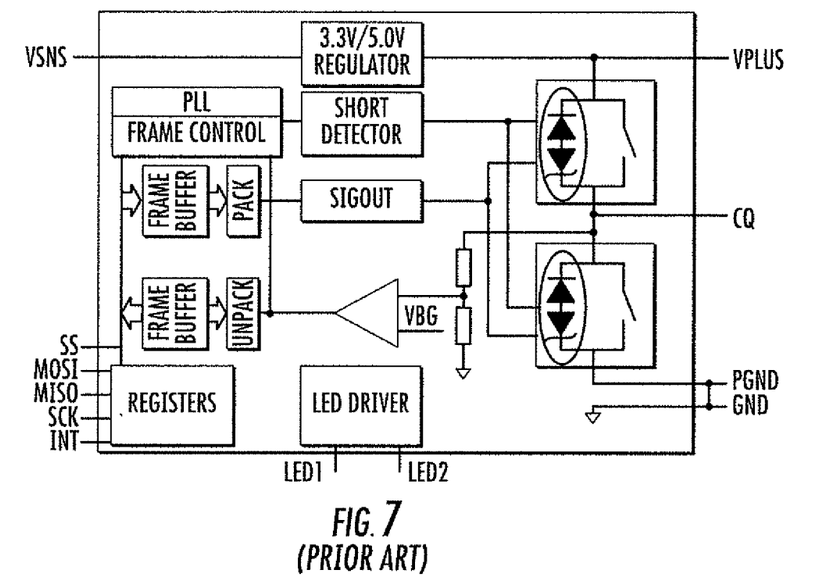
FIG. 7 is a block diagram of a prior art transceiver manufactured by HMT Microelectronic AG, in which the internal passive components of the protection circuit are highlighted.

Another transceiver for IO-Link applications, manufactured by HMT Microelectronic AG, is depicted in FIG. 7. The protection circuit is includes passive components, namely two diodes and two Zener diodes, that occupy a relatively large silicon area and, in general, reduce power efficiency of the system.

SUMMARY

It has been found a transceiver for IO-Link™ devices connectable to a three-wire cable, that includes an output stage with a protection circuit that may be integrated with the circuit blocks of the transceiver.

This has been attained with a protection circuit, including a high-side leg, comprising two P-type transistors connected in series between them such to have a current terminal in common, coupled between the input/output pin and said positive supply pin, the current terminal in common of the two P-type transistors being connected to an internal positive voltage line of the transceiver, the body regions of the P-type transistors being shorted to the common current terminal of the high-side leg. The protection circuit may also include a low-side leg, comprising two N-type transistors connected in series between them such as to have a current terminal in common, coupled between the input/output pin and the negative supply pin, the current terminal in common of the two N-type transistors being connected to an internal negative voltage line of the transceiver, the body regions of the N-type transistors being shorted to the shared common current terminal of the low-side leg.

The transceiver may comprise a driver configured to be supplied with the voltages on the internal negative and positive supply voltage lines and to turn on/off the P-type and N-type transistors to allow transmission on the data line. The protection circuit comprises a voltage clamper connected between the current terminal shared by the two P-type transistors and the current terminal shared by the two N-type transistors, configured to enter in a conduction state in case of an overvoltage on the negative and positive supply voltage lines.

IO-Link™ devices comprising the above described transceiver and optionally a microcontroller are also disclosed.

DETAILED DESCRIPTION

Figure 8A:
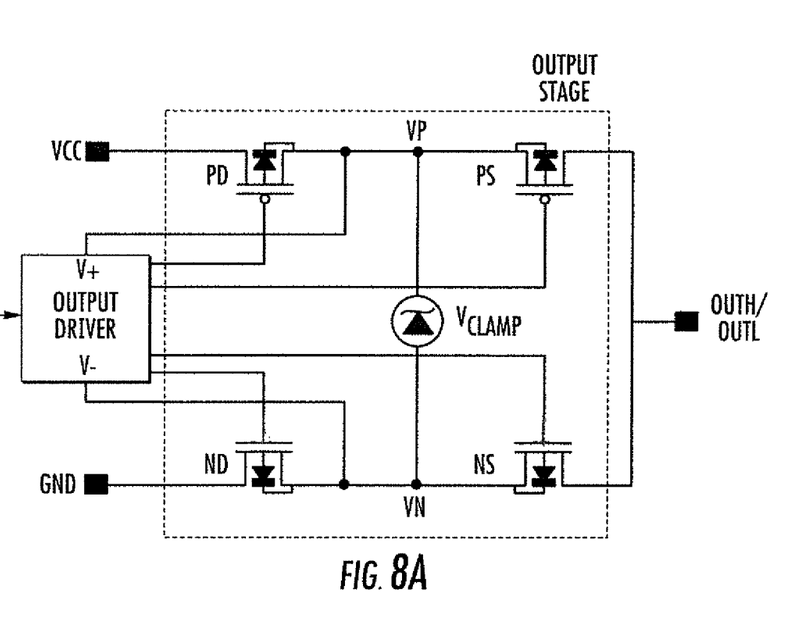
FIG. 8A shows a protection circuit included in the output stage of a transceiver of this disclosure with a single input/output pin, having high-side and low-side legs, a voltage clamper connected therebetween and a driver for properly controlling the transistors of both legs.
Figure 8B:
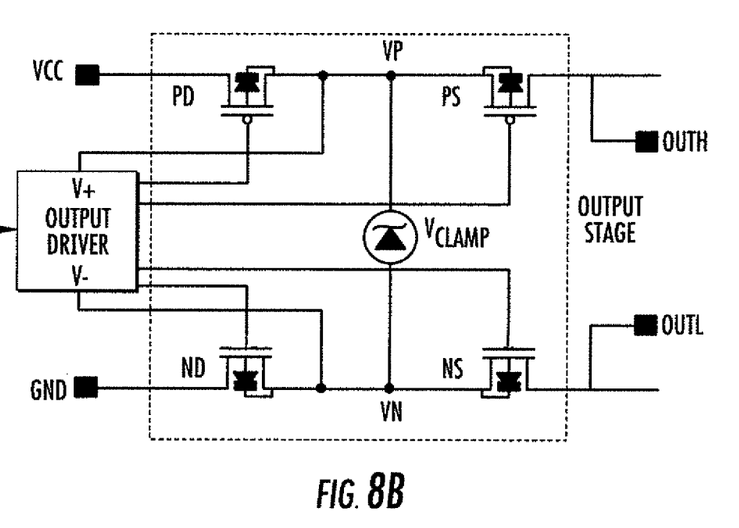
FIG. 8B shows a protection circuit included in the output stage of a transceiver of this disclosure with two distinct input/output pins, having high-side and low-side legs, a voltage clamper connected therebetween and a driver for properly controlling the transistors of both legs.

A transceiver according to this disclosure overcomes the above discussed limitations of the known transceivers because it has an output stage OUTPUT STAGE with a protection circuit as shown in FIG. 8A or 8B. The output stage and the protection circuit may be easily integrated in monolithic form with the blocks that provide the transceiver, which do not need external passive components to be protected against connections with inverted polarity of the supply pins to the supply lines of the cable.

The transceiver of this disclosure may have a single input/output pin OUTH/OUTL, as shown in FIG. 8A, or two distinct input/output pins OUTH and OUTL, as shown in FIG. 88. In the ensuing description reference will be made to the embodiment of FIG. 8B, which is more general. When the transceiver of FIG. 8B is to be used in IO-Link™ devices, the two input/output pins OUTH and OUTL are shorted together, thus being electrically equivalent to the transceiver of FIG. 8A, and connected to a data line of the three-wire connection cable of the IO-Link™ system. In systems of other types, the high-side and low-side input/output pins OUTH and OUTL, respectively, may be connected to different lines, as will be discussed hereinafter.

Differently from the known transceivers, the transceiver of FIG. 8B has a high-side leg comprising two P-type transistors PS and PD connected in series between the high-side input/output pin OUTH and the positive supply pin Vcc, and a low-side leg comprising two N-type transistors NS and ND connected in series between the low-side input/output pin OUTL and the negative supply pin GND.

The P-type transistors of the high-side leg and the N-type transistors of the low-side leg have a respective current terminal in common, on which an internal positive voltage VP and an internal negative voltage VN, respectively, that are distributed to inner circuits of the transceiver as internal power supply, are made available. A voltage clamper VClamp, connected between the current terminal shared by the P-type transistors and the current terminal shared by the N-type transistors, protects the transceiver against overvoltage.

According to an innovative aspect, the body regions of the P-type transistors are shorted to the current terminal they share, and the body regions of the N-type transistors are shorted to the current terminal they share.

The protection circuit shown in FIGS. 8A and 8B is effective for preventing or reducing circulation of currents throughout the transceiver when the terminals are connected with a wrong polarity to the wires of the cable.

The following Table 1 presents the possible combinations of voltages on the pins of the transceiver of FIG. 8B of this disclosure:

TABLE 1

|  | VCC | GND | OUTH | OUTL |
|---|---|---|---|---|
| Case 1 (Correct connection) | High | Low | Low | Low |
| Case 2 | Low | High | Low | Low |
| Case 3 | Low | Low | High | Low |
| Case 4 | Low | Low | Low | High |
| Case 5 | Low | High | High | High |
| Case 6 (Correct connection) | High | Low | High | High |
| Case 7 | High | High | Low | High |
| Case 8 | High | High | High | Low |

It should be noticed that, for IO-Link™ devices, the input/output pins OUTH and OUTL are shorted together and connected to the same data line, thus only cases 1, 2, 5 and 6 apply in IO-Link™ systems.

The above table has been filled in considering that three of the four pins VCC, GND, OUTH, OUTL are always at a same supply voltage and the remaining pin is at the other supply voltage.

In order to be effective, the protection circuit may be such that, once the pins are connected to the respective wires and before turning on the transceiver to enable it to transmit over the data line of the cable, no current can circulate throughout the transceiver if the pins are not connected with the correct polarity.

This condition is ensured in the transceiver of this disclosure because the intrinsic body diodes of the integrated transistors of the high-side leg and of the low-side leg are configured such as to be in the functioning conditions presented in Table 2 for the not operative cases, considering the case in which all transistors of the high-side leg and of the low-side leg are OFF:

TABLE 2

|  | PD | PS | ND | NS | CLAMP |
|---|---|---|---|---|---|
| Case 2 | OFF | OFF | Blocking | OFF | OFF |
| Case 3 | Blocking | Passing | OFF | OFF | Blocking |
| Case 4 | OFF | OFF | OFF | Blocking | OFF |
| Case 5 | Blocking | Passing | Blocking | Blocking | Blocking |
| Case 7 | Passing | Blocking | Blocking | Blocking | Blocking |
| Case 8 | OFF | OFF | Blocking | OFF | Blocking |

The term "Blocking" means that the intrinsic diode or voltage clamper is reverse biased and is withstanding a reverse voltage applied thereon, the term "OFF" means that it is not biased at all, the term "Passing" means that it is directly biased and is in a conduction state.

The above table shows that no current can circulate throughout the transceiver when the positive and negative supply pins are not connected with the correct polarity to the wires of the cable. Therefore, the depicted circuit may be integrated on a same substrate together with the internal circuits of the transceiver, that in FIGS. 8A and 8B are represented with a block OUTPUT DRIVER that includes also a driver of the P-type and N-type transistors, being sure that no disruptive current will accidentally flow throughout the integration substrate of transceiver when its pins have been connected with the wrong polarity to the wires of the cable.

By contrast, when the positive and negative supply pins are connected with the correct polarity, the intrinsic body diodes of the transistors PD and ND are in a "Passing" state, the intrinsic body diodes of the transistors PS and NS are in a "Blocking" state and in a "OFF" state, respectively, the voltage clamper VClamp is in a "Blocking" state and the internal supply voltages VP and VN are the voltages on the positive supply pin VCC and negative supply pin GND, respectively. Therefore, the internal circuits of the transceiver, represented as a single block OUTPUT DRIVER, are supplied with the correct polarity.

Figure 9:
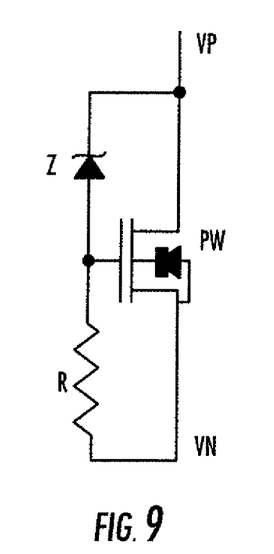
FIG. 9 depicts an embodiment of the voltage clamper of the protection circuit shown in FIGS. 8A and 8B.

According to an embodiment, the voltage clamper VClamp may be realized as shown in FIG. 9, with:

a N-type power transistor PW having an intrinsic diode connected such to be in a conduction state when the voltage VN, on the shared current terminal of the transistors of the low-side leg, is greater than the voltage VP on the shared current terminal of the transistors of the high-side leg;

a bias Zener diode Z, configured to enter in a conduction state when the voltage drop VP-VN exceeds a maximum value. The diode Z has a voltage drop in a conduction state sufficient for turning on the power transistor PW; and a bias resistor R dimensioned for biasing the Zener diode in case of overvoltage on the negative and positive supply voltage lines, and for turning the power transistor PW off otherwise.

Differently from the prior transceivers, the largest part of the current flows throughout the power transistor PW and not throughout the Zener diode Z, which has only to keep on the transistor PW when the voltages VP and VN correspond to the positive supply voltage and to the negative supply voltage, respectively. This architecture is particularly advantageous because it uses the power transistor PW as a shorting element instead of a Zener diode, as in the IO-Link™ devices of FIGS. 5, 6*a* and 7, that cause a greater power dissipation.

Figure 10A:
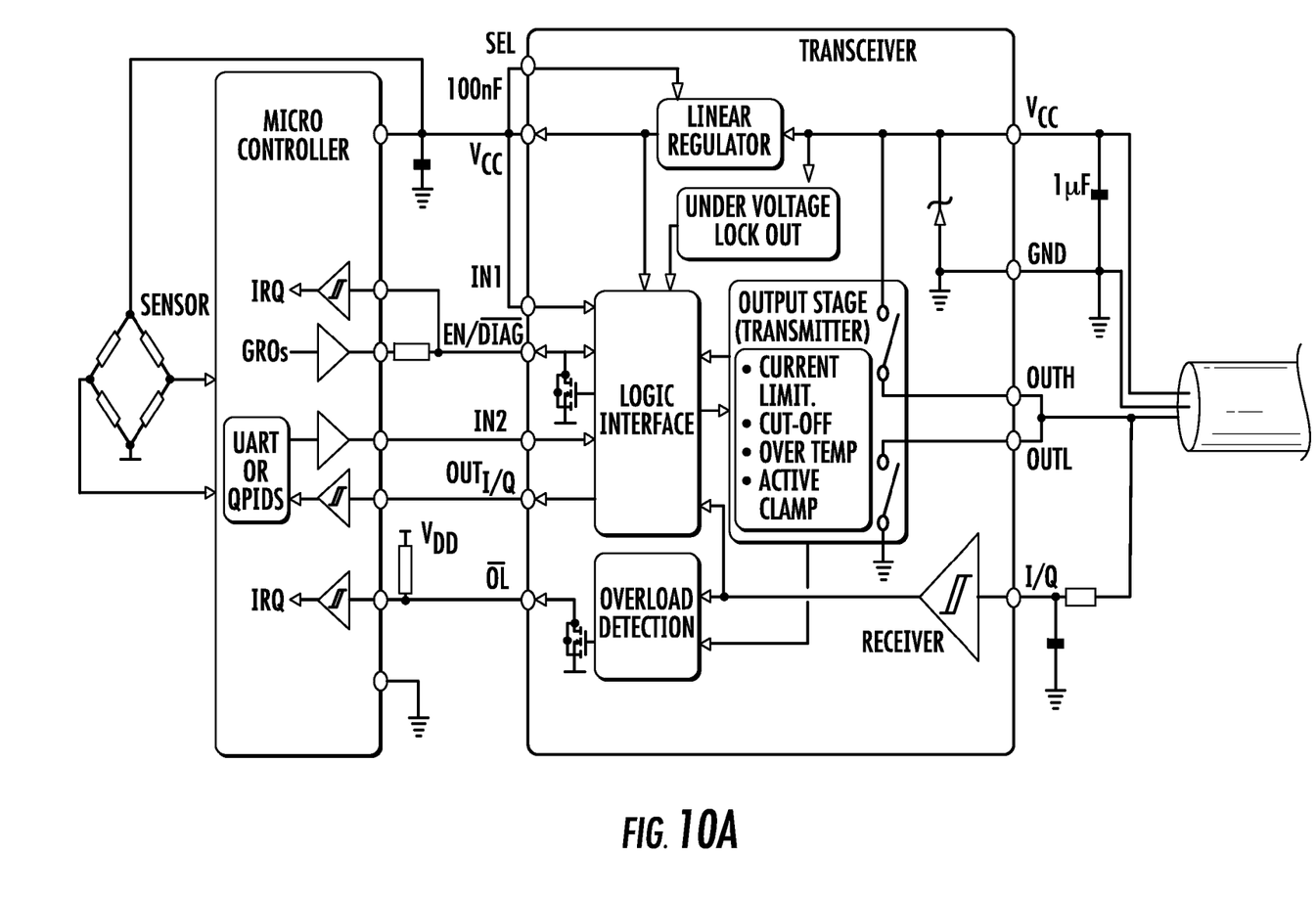
FIG. 10A is an exemplary block diagram of an IO-Link™ slave device of this disclosure, composed of a transceiver of this disclosure in a push-pull configuration connected to a microcontroller and to an external sensor.
Figure 10B:
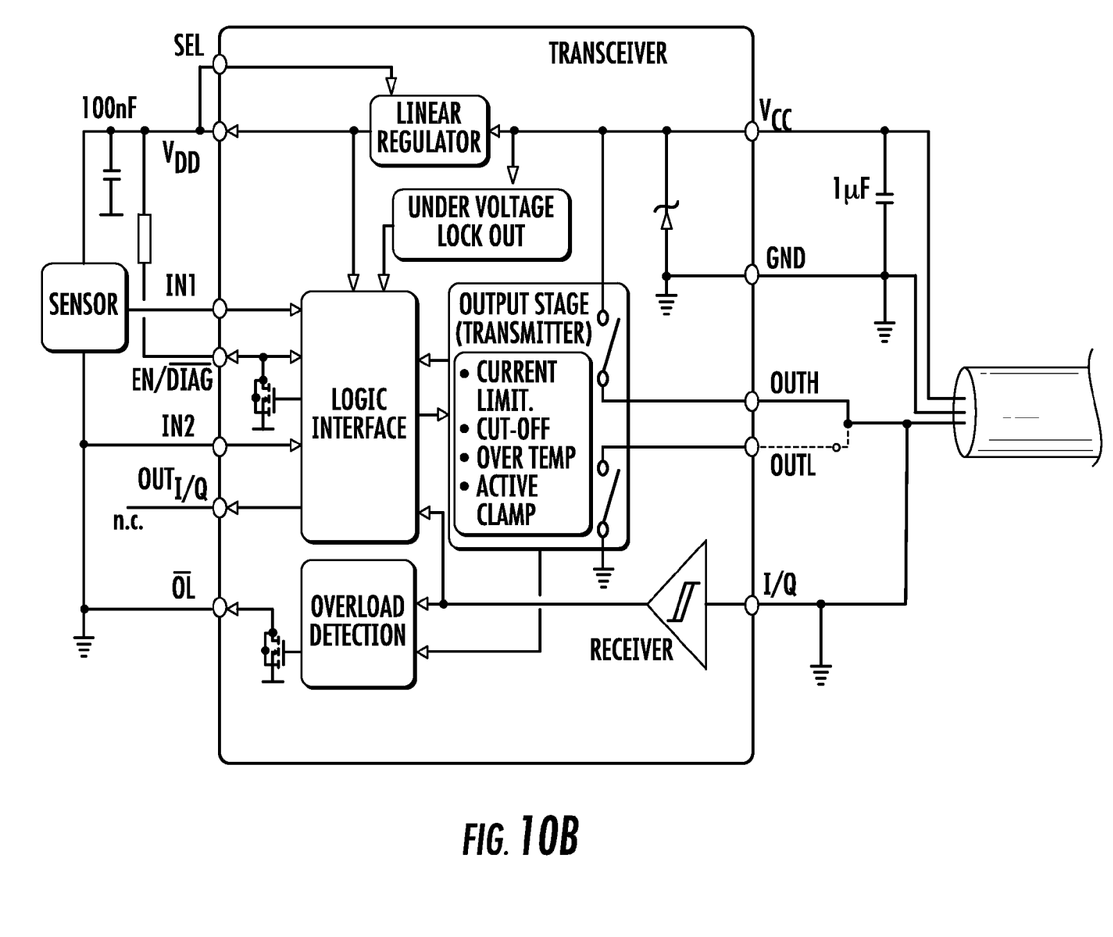
FIG. 10B is an exemplary block diagram of an IO-Link™ slave device of this disclosure, composed of a transceiver of this disclosure in a high-side configuration directly connected to an external sensor.

Exemplary embodiments of IO-Link™ devices according to this disclosure, connected to a sensor SENSOR eventually through a microcontroller MICROCONTROLLER, are depicted in FIGS. 10*a* and 10*b*. The meaning and function of each block is summarized in the following table:

TABLE 3

| | |
|---|---|
| Linear Regulator | Provides a regulated voltage for the internal circuitry and external to the device. |
| Under Voltage Lock Out | Controls the switching on and off of the entire internal circuitry |
| Logic Interface | Digital interface between device and controller (or sensor) |
| Output Stage | the output stage depicted in FIGS. 8A and 8B |
| Over Load Detection | Detects conditions Overload on line |
| Receiver | Receiver integrated |
| SEL | select two distinct values of regulated voltage |
| VDD | Regulated supply pin |
| IN1 | Controls the output stage pin |
| EN/$\overline{\text{DIAG}}$ | Diagnostic pin |

TABLE 3-continued

| | |
|---|---|
| IN2 | Controls the output stage pin |
| OUTiq | Output receiver pin |
| $\overline{\text{OL}}$ | Overload pin |
| I/Q | Input pin of the integrated receiver |
| VCC | positive supply pin |
| GND | negative supply pin |
| OUTH | high-side input/output pin |
| OUTL | low-side input/output pin |

Both input/output pins OUTH and OUTL may be shorted together and connected to the digital data line of the three-wire cable, as shown in FIG. 10*a*, to realize a push-pull IO-Link™ device. As an alternative, only the high-side input/output pin OUTH may be connected to a digital data line and the low-side input/output pin OUTL is left isolated, as shown in FIG. 10*b*, or vice versa (not shown).

The herein disclosed transceiver does not need external components, includes an output stage, substantially made only of transistors that may absorb great currents with a reduced power consumption and that protects the inner circuits of the transceiver itself also against bursts, voltage surges, ESD (ElectroStatic Discharges) and overvoltage, that are likely to occur in industrial environments, in which IO-Link™ devices are destined to operate.

That which is claimed is:

1. A transceiver suitable for IO-Link™ devices, connectable to a cable with at least three wires, comprising:
   a positive supply pin connectable to a positive supply wire of the cable on which a positive supply voltage is made available;
   a negative supply pin connectable to a negative supply wire of the cable on which a negative supply voltage is made available;
   at least one input/output pin connectable to a digital data wire of the cable configured to receive/transmit data signals switching between the positive supply voltage and negative supply voltage from/to IO-Link™ devices connected to the cable;
   inner functional blocks;
   an internal positive voltage line;
   an internal negative voltage line; and
   a controlled output stage configured to connect said at least one input/output pin to said positive supply pin or to said negative supply pin, including a protection circuit for said inner functional blocks against reverse polarity due to a wrong connection of said positive and negative supply pins to respective wires of the cable;
   said controlled output stage comprising
      a high-side leg, comprising two P-type transistors connected in series between them such as to have a common current terminal, coupled between said at least one input/output pin and said positive supply pin, the common current terminal being connected to said internal positive voltage line, said P-type transistors having body regions being shorted to the common current terminal, and
      a low-side leg, comprising two N-type transistors connected in series between them such as to have a common current terminal, coupled between said at least one input/output pin and said negative supply pin, the common current terminal being connected to said internal negative voltage line, said N-type transistors having body regions being shorted to the common current terminal; and a driver comprising a first current path extending between a positive supply terminal and the common current terminal of the high-side leg, and a second current path extending between a negative supply terminal and common current terminal of the low-side leg, and being configured to turn on/off said two P-type and two N-type transistors to allow transmission on the digital data wire;

said protection circuit comprising a voltage clamper connected between the common current terminal for said high-side leg and the common current terminal for said low-side leg, configured to enter in a conduction state in case of overvoltage on the internal negative and positive supply voltage lines.

2. The transceiver of claim 1, wherein said voltage clamper comprises a power transistor connected to short said common current terminals when in a conduction state; and a bias Zener diode connected between a control terminal of said power transistor and the common current terminal of said high-side leg, configured to enter in a conduction state and to cause a voltage drop suitable for turning on said power transistor in case of an overvoltage on said internal negative and positive supply voltage lines.

3. The transceiver of claim 2, further comprising a bias resistor connected between said control terminal of the power transistor and the common current terminal of said low-side leg.

4. The transceiver of claim 1, wherein said at least one input/output pin comprises a high-side input/output pin and a low-side input/output pin, both connectable to the data wire of the cable, said high-side leg being connected between said high-side input/output pin and said positive supply pin, and said low-side leg being connected between said low-side input/output pin and said negative supply pin.

5. The transceiver of claim 1, wherein said protection circuit is realized in integrated form along with said inner functional blocks.

6. An electronic device connectable to a cable with at least three wires, comprising:
   a positive supply pin connectable to a positive supply wire of the cable;
   a negative supply pin connectable to a negative supply wire of the cable;
   at least one output pin connectable to a digital data wire of the cable; and
   a controlled output stage comprising
      a high-side leg, comprising two P-type transistors coupled in series and having a common current terminal, coupled between said at least one output pin and said positive supply pin, said P-type transistors having body regions coupled to the common current terminal,
      a low-side leg, comprising two N-type transistors coupled in series and having a common current terminal, coupled between said at least one output pin and said negative supply pin, said N-type transistors having body regions coupled to the common current terminal,
      a driver comprising a first current path extending between a positive supply terminal and the common current terminal of the high-side leg, and a second current path extending between a negative supply terminal and common current terminal of the low-side leg, and being configured to turn on/off said two P-type and two N-type transistors, and
      a protection circuit comprising a voltage clamper coupled between the common current terminal for said high-side leg and the common current terminal for said low-side leg.

7. The electronic device of claim 6, further comprising inner functional blocks; and wherein said protection circuit is configured for protecting said inner functional blocks against reverse polarity due to a wrong connection of said positive and negative supply pins to respective wires of the cable.

8. The electronic device of claim 6, wherein said voltage clamper comprises a power transistor coupled to short the common current terminals when in a conduction state; and a Zener diode coupled between a control terminal of said power transistor and the common current terminal of said high-side leg.

9. The electronic device of claim 8, further comprising a bias resistor coupled between the control terminal of said power transistor and the common current terminal of said low-side leg.

10. The electronic device of claim 6, wherein said at least one output pin comprises a high-side output pin and a low-side output pin, both connectable to the data wire of the cable, said high-side leg being coupled between said high-side output pin and said positive supply pin, and said low-side leg being coupled between said low-side output pin and said negative supply pin.

11. The electronic device of claim 6, wherein said protection circuit is realized in integrated form.

12. The electronic device of claim 6, wherein said positive supply pin, negative supply pin, at least one output pin, and controlled output stage define an IO-Link™ device transceiver.

13. The electronic device of claim 12, further comprising a microcontroller coupled to said IO-Link™ device transceiver.

14. An method for making an electronic device connectable to a cable with at least three wires, the electronic device comprising a positive supply pin connectable to a positive supply wire of the cable, a negative supply pin connectable to a negative supply wire of the cable, and at least one output pin connectable to a digital data wire of the cable; the method comprising:
   forming a controlled output stage comprising
      a high-side leg, comprising two P-type transistors coupled in series and having a common current terminal, coupled between the at least one output pin and the positive supply pin, the P-type transistors having body regions coupled to the common current terminal,
      a low-side leg, comprising two N-type transistors coupled in series and having a common current terminal, coupled between the at least one output pin and the negative supply pin, the N-type transistors having body regions coupled to the common current terminal,
      a driver comprising a first current path extending between a positive supply terminal and the common current terminal of the high-side leg, and a second current path extending between a negative supply terminal and common current terminal of the low-side leg, and being configured to turn on/off the two P-type and two N-type transistors to allow transmission on the digital data wire, and
      a protection circuit comprising a voltage clamper coupled between the common current terminal for the high-side leg and the common current terminal for the low-side leg.

15. The method of claim 14, wherein the protection circuit is configured for protecting inner functional blocks of the electronic device against reverse polarity due to a wrong connection of the positive and negative supply pins to respective wires of the cable.

16. The method of claim 14, wherein the voltage clamper comprises a power transistor coupled to short the common current terminals when in a conduction state; and a Zener diode coupled between a control terminal of the power transistor and the common current terminal of the high-side leg.

17. The method of claim 16, further comprising a bias resistor coupled between the control terminal of the power transistor and the common current terminal of the low-side leg.

18. The method of claim 14, wherein the protection circuit is realized in integrated form.

19. The method of claim 14, wherein the positive supply pin, negative supply pin, at least one output pin, and controlled output stage define an IO-Link™ device transceiver.

* * * * *